United States Patent
Matthews et al.

(10) Patent No.: US 10,274,027 B2
(45) Date of Patent: Apr. 30, 2019

(54) SEALED ACTUATOR WITH INTERNAL CLUTCHING

(71) Applicant: MAGNA EXTERIORS INC., Concord (CA)

(72) Inventors: Martin R. Matthews, Troy, MI (US); Anthony J. Povinelli, Romeo, MI (US)

(73) Assignee: Magna Exteriors Inc., Concord (CA)

( * ) Notice: Subject to any disclaimer, the term of this patent is extended or adjusted under 35 U.S.C. 154(b) by 295 days.

(21) Appl. No.: 14/899,729

(22) PCT Filed: Jun. 19, 2014

(86) PCT No.: PCT/US2014/043185
§ 371 (c)(1),
(2) Date: Dec. 18, 2015

(87) PCT Pub. No.: WO2014/205217
PCT Pub. Date: Dec. 24, 2014

(65) Prior Publication Data
US 2016/0230820 A1 Aug. 11, 2016

Related U.S. Application Data

(60) Provisional application No. 61/836,936, filed on Jun. 19, 2013.

(51) Int. Cl.
*F16D 43/202* (2006.01)
*F16H 35/10* (2006.01)
(Continued)

(52) U.S. Cl.
CPC ........ *F16D 43/2024* (2013.01); *B60K 11/085* (2013.01); *F16D 7/044* (2013.01);
(Continued)

(58) Field of Classification Search
CPC .. F16D 43/2024; F16D 2300/26; F16D 7/044; F16H 1/16; F16H 35/10;
(Continued)

(56) References Cited

U.S. PATENT DOCUMENTS

| | | | |
|---|---|---|---|
| 5,769,177 A * | 6/1998 | Wickman | B60K 6/00 180/65.22 |
| 6,149,544 A * | 11/2000 | Masberg | B60K 6/26 180/65.25 |
| 6,184,603 B1 * | 2/2001 | Hamai | B60K 6/26 180/65.22 |
| 6,322,221 B1 | 11/2001 | van de Loo | |

(Continued)

FOREIGN PATENT DOCUMENTS

| | | |
|---|---|---|
| DE | 19509568 C1 | 8/1996 |
| EP | 0802348 A2 | 10/1997 |

(Continued)

OTHER PUBLICATIONS

Translation of foreign document DE 19509568 C1 (Year: 1996).*

*Primary Examiner* — Alex W Mok
(74) *Attorney, Agent, or Firm* — Warn Partners, P.C.

(57) ABSTRACT

A sealed actuator with internal clutching assembly including an output shaft, output detent ring, moving detent ring, and a wave spring, which is fit inside a sealed housing. The moving detent ring is able to move axially to the output shaft and the output detent ring is able to rotate on the output shaft. Intermeshing ramped teeth of these rings are held together by a wave spring and allow the output shaft to rotate and transmit torque of a motor through a main gear operably coupled to an output gear mounted on the output shaft to the outside of the housing. During predetermined high loads, the output and moving detent rings ramped teeth create an axial force that overcomes the load from the wave spring, which allows moving detent ring to disengage and output shaft to rotate freely to help prevent damage to the actuator.

23 Claims, 6 Drawing Sheets

(51) Int. Cl.
  *H02K 5/22* (2006.01)
  *B60K 11/08* (2006.01)
  *H02K 7/116* (2006.01)
  *H02K 7/11* (2006.01)
  *F16D 7/04* (2006.01)
  *F16H 1/16* (2006.01)

(52) U.S. Cl.
  CPC ............... *F16H 1/16* (2013.01); *F16H 35/10* (2013.01); *H02K 5/225* (2013.01); *H02K 7/11* (2013.01); *H02K 7/1166* (2013.01); *F16D 2300/26* (2013.01)

(58) Field of Classification Search
  CPC ........ B60K 11/085; H02K 5/225; H02K 7/11; H02K 7/1166
  USPC ........................................................... 310/71
  See application file for complete search history.

(56) References Cited

U.S. PATENT DOCUMENTS

| | | | |
|---|---|---|---|
| 7,374,299 B2 | 5/2008 | Brouwer et al. | |
| 8,366,284 B2 | 2/2013 | Flynn et al. | |
| 2005/0161577 A1* | 7/2005 | French | H02K 5/00 248/672 |
| 2006/0081800 A1* | 4/2006 | Riester | H02K 7/14 251/129.01 |
| 2008/0284265 A1* | 11/2008 | Chaohai | H02K 5/10 310/89 |

FOREIGN PATENT DOCUMENTS

| | | |
|---|---|---|
| EP | 1594212 A2 | 11/2005 |
| EP | 1755923 A1 | 2/2007 |
| GB | 616119 A | 1/1949 |

* cited by examiner

SEALED ACTUATOR WITH INTERNAL CLUTCHING

CROSS-REFERENCE TO RELATED APPLICATIONS

This application is a National Stage of International Application No. PCT/US2014/043185, filed Jun. 19, 2014. This application claims benefit of U.S. Provisional Patent Application No. 61/836,936 filed Jun. 19, 2013. The disclosures of the above applications are incorporated herein by reference.

FIELD OF THE INVENTION

The present invention relates to a clutch system for use in an actuator assembly for a vehicle.

BACKGROUND OF THE INVENTION

Clutched actuator assemblies to fold a vehicle mirror are known. These mechanisms are known to have many disadvantages and are also not robust enough for particular applications. Generally, the actuator is a hinged actuator with a base that must be fixed and an upper half that provides the movement of 80 degrees only. This base and upper half also move apart during clutching. Known actuators are not waterproof, do not meet cycle requirements, and do not meet requirements for other more robust assembly needs such as are necessary in vehicle aerodynamic structures. Conventional actuators do not have the combination of the desired attributes of a high cycle life, safety overload clutch, being waterproof, and holding torque capacity.

Therefore, it is desired to provide an actuator assembly that provides an actuator which is protected from environmental elements in vehicle underbody environments, has improved cycle durability, can drive in both directions, holds its position when stopped, has pass through drive, and has a clutch system to protect the actuator under higher predetermined loads.

SUMMARY OF THE INVENTION

The present invention is directed to a sealed actuator with internal clutching assembly. There is provided a clutch system comprising an output shaft, output detent ring, moving detent ring, and a wave spring lock, which is fit inside a sealed two-part housing. The moving detent ring is able to move axially to the output shaft and the output detent ring is able to rotate on the output shaft. Intermeshing ramped teeth of these rings are held together by the wave spring lock and allow the output shaft to rotate and transmit torque to a motor through a main gear operably coupled to an output gear held by the output shaft to the outside of the two-part housing.

The actuator is operable to drive in both directions, but when stopped will hold its position without back driving when subjected to a load many times greater than its dynamic range. The actuator will also protect itself from damage from predetermined loads, very high predetermined loads, due to the clutch system that will disengage the drive system allowing it to rotate. During a predetermined high load condition, the output and moving detent rings ramped teeth create an axial force that overcomes the load from the wave spring, which allows the moving detent ring to disengage and the output shaft to rotate freely to help prevent damage to the actuator.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
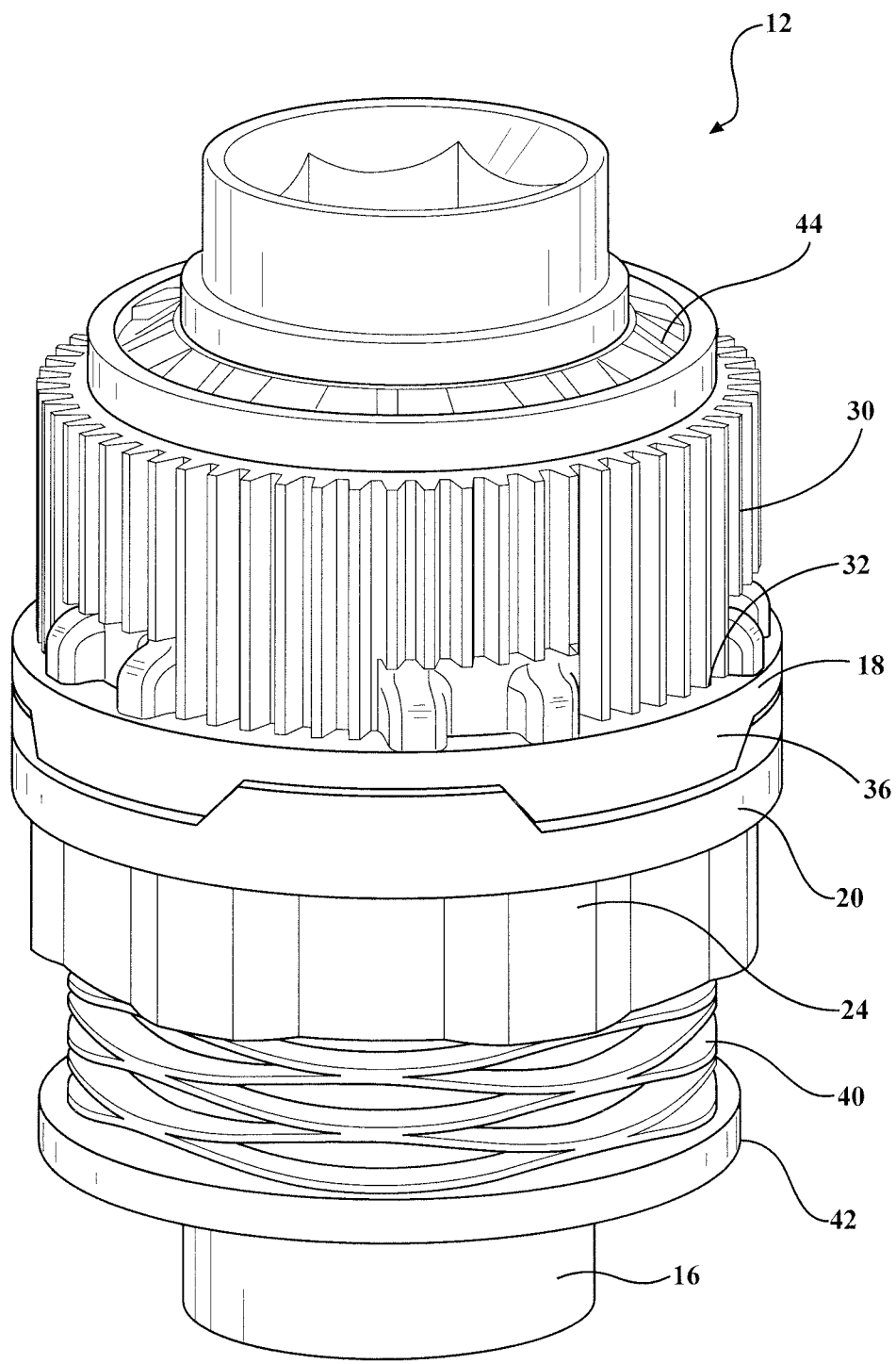
FIG. 1 is a perspective view of a clutch system for an actuator assembly, in accordance with the present invention.
Figure 2:
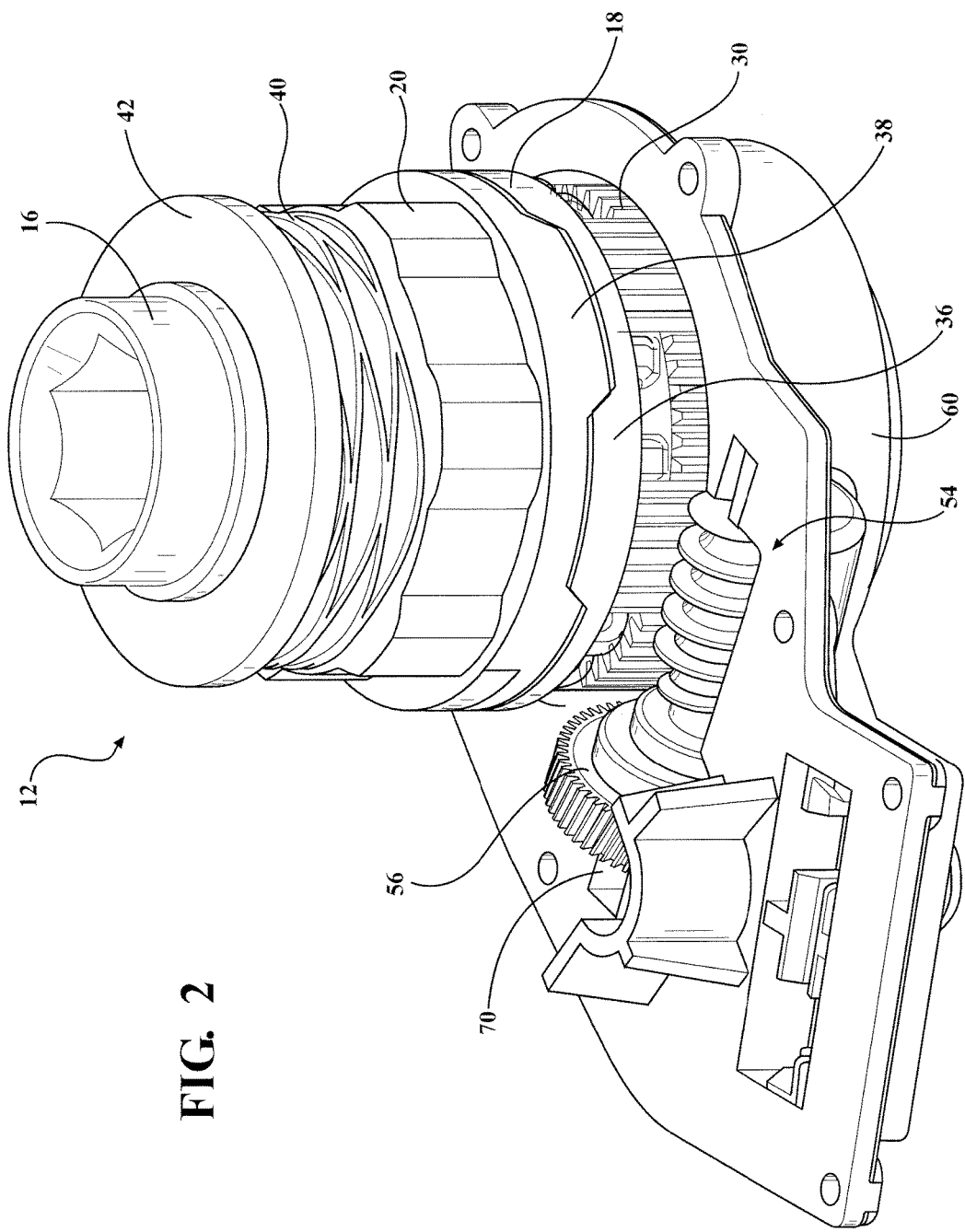
FIG. 2 is a perspective view of an actuator with internal clutching assembly with a housing and motor arrangement removed for clarity, in accordance with the present invention.
Figure 3:
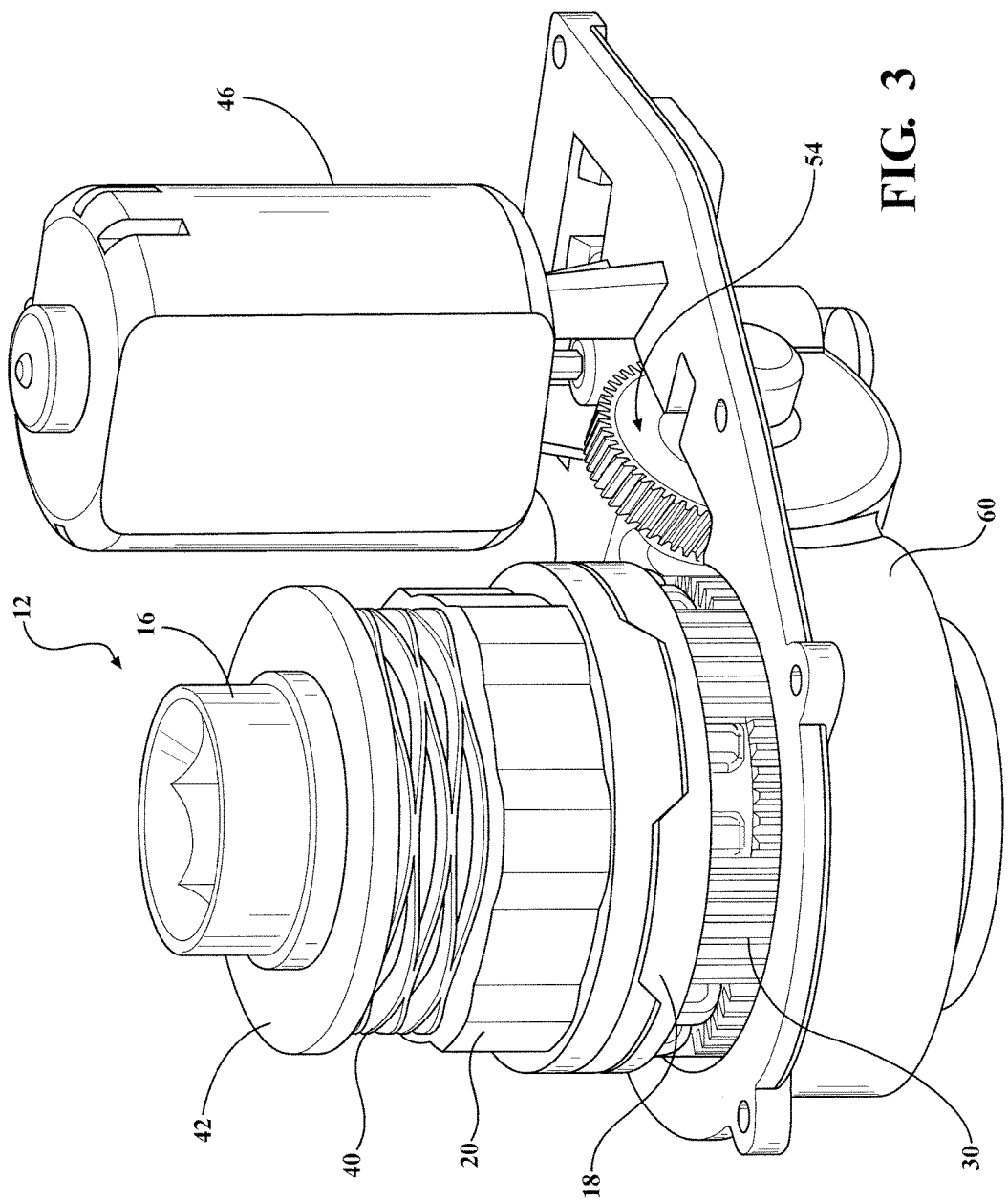
FIG. 3 is a perspective view of the sealed actuator with internal clutching assembly with a housing removed for clarity, in accordance with the present invention.
Figure 4:
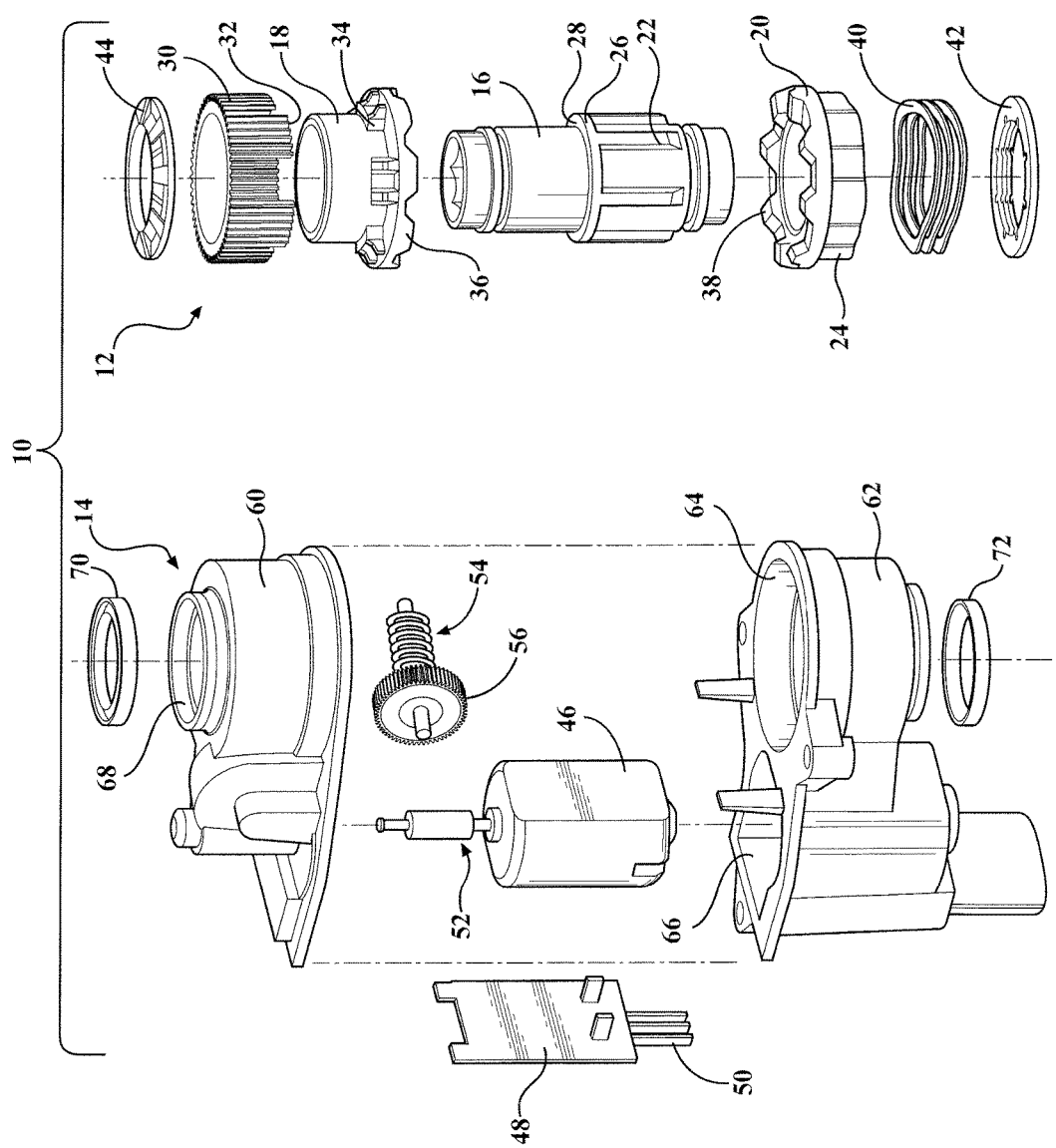
FIG. 4 is an exploded view of the actuator with internal clutching assembly, in accordance with the present invention.

The following description of the preferred embodiment(s) is merely exemplary in nature and is in no way intended to limit the invention, its application, or uses.

There is provided a sealed actuator with internal clutching assembly in accordance with the present invention which provides desirable higher cycle durability and capability combined with a water tight arrangement for use, by way of example, in underbody environments exposed to the elements. The sealed actuator with internal clutching assembly further provides a safety override clutch system which allows the actuator to rotate under predetermined conditions, e.g., predetermined high loads, to help protect a motor and other components of the actuator with internal clutching assembly, as will be explained in greater detail below. When subjected to abnormal loads or a predetermined amount of force or other predetermined conditions, the actuator with internal clutching assembly will move features out of the way to help prevent damage thereto.

Referring generally to FIGS. 1-4, a sealed actuator with internal clutching assembly is shown generally at 10, comprising a clutch system, generally shown at 12, and housing portion, generally shown at 14. The clutch system 12 comprises an output shaft 16 which is received within and holds an output detent ring 18 and a moving detent ring 20.

The output detent ring 18 is free to rotate on the output shaft 16 about a portion of the output shaft 16 that is not splined. The moving detent ring 20 is able to move axially to the output shaft 16 but is locked radially by a plurality of interlocking splines 22, 24 on both components. The output shaft 16 has interlocking splines 22 that are arranged parallel to the longitudinal axis and operably spaced about an outer surface located on a lower half of the output shaft 16. The moving detent ring 20 has outer interlocking splines 24 forming complementary channels to slidably interlock with the interlocking splines 22 for controlled axial movement of the moving detent ring 20. The interlocking splines 22 of the output shaft 16 terminate at an integrally formed projecting ring 26 having an abutting surface 28, lying transverse to the axis, against which the output detent ring 18 engages. The output detent ring 18 abuts against this surface 28 on the output shaft 16 and does not move axially.

An output gear 30 is in mesh with the output detent ring 18 for transmitting torque. The output gear 30 has spaced circumferential segments 32 that are generally square teeth like shaped held in place within opposing recesses 34 of the output detent ring 18 for transmitting the torque.

The output and moving detent rings 18, 20 have first and second intermeshing ramped teeth, generally shown at 36, 38, respectively, that are held together in mesh by the biasing force of a wave spring 40. The wave spring 40 is received on the outer output shaft 16 and provides a biasing force against the moving detent ring 20 in the direction of the output detent ring 18.

The components of the clutch system 10 (e.g., output shaft 16, output gear 30, output detent ring 18, moving detent ring 20, and wave spring 40) are held together by first and second locking rings 42, 44 located toward respective ends the output shaft 16 of the clutch assembly 12.

A motor 46 selectively provides torque suitable for particular applications. Suitable electontronics 48 (e.g., a shut off printed circuit board (PCB)) with connector contacts 50 correlate with vehicle communication networks and/or at least one sensor for commanding the motor 46 based upon predetermined conditions. By way of non-limiting example, energizing of the motor correlating with vehicle speed.

The motor 46 has a worm gear, shown generally at 52, which causes a main gear, shown generally at 54, to rotate. The main gear 54 has a gear and a helix angle portion 58. The worm gear 52 has a shaft, e.g., a threaded shaft, which engages the teeth of the gear 56, which causes the gear 56 of the main gear 54 to rotate as the worm gear 52 rotates. Rotation of the gear 56 causes the helix angle portion 58 of the main gear 54 to also rotate. The helix angle portion 58 rotatably engages the output gear 30. The gear ratio range of the gear 56 to helix angle portion 58 is operably suitable for transmitting torque from the motor/worm gear 46/52 to the output gear 30. The first and second intermeshing ramped teeth 36,38 of the output and moving detent rings 18,20 when held together by the biasing force of the wave spring 40 lock and allow the output shaft 16 to rotate and transmit the torque of the motor 46 through the main gear 54 and output gear 30 to the outside of the housing portion 14. By way of non-limiting example, the output shaft 30 is coupled to a component and/or coupled to a drive shaft for selectively rotating, folding or otherwise moving at least one component located outside of the housing portion 14 between at least a first position and a second position. The wave spring 40 allows for a more compact structure while meeting biasing and predetermined load requirements.

The housing portion 14 comprises a first half 60 and a second half 62. The first half 60 has a first clutch assembly cavity 64 and a first motor cavity 66. The second half 62 has a second clutch assembly cavity 68, a main gear cavity 70, and a second motor cavity. The clutch system 12 fits fully inside the first and second halves 60, 62 of the housing (within the first and second clutch assembly cavities 64, 68), as well as the motor 46 and electronics 48/50 (within the first motor cavity 66 and second motor cavity), and main gear 54 (within the main gear cavity 70). The first and second halves 60, 62 of the housing portion 14 are joined together, and connected with fasteners, and first and second seals added 72, 74 onto the output shaft 16 to form a weathertight housing.

In operation, the first and second intermeshing ramped teeth 36, 38 of the output and moving detent rings 18, 20, that when held together by the biasing force of the wave spring 40, lock together and allow the output shaft 16 to rotate. This allows torque transmission from the motor 46/worm gear 52 through the main gear 54 and output gear 30 to the outside of the housing portion 14 via the output shaft 16. During a predetermined level of high load, the first and second intermeshing ramped teeth 36, 38 create an axile force that overcomes the load from the wave spring 40. This allows the moving detent ring 20 to disengage and allow the output shaft 16 to rotate freely, thereby preventing damage to the sealed actuator internal clutching assembly 10.

Thus, there is provided a sealed actuator with internal clutching assembly 10 which can drive in both directions, but when stopped will hold its position without back driving when subjected to a predetermined load, e.g., a load many times greater than its dynamic range. The actuator 10 also protects itself from damage from predetermined loads, e.g., very high loads, by means of the clutch that will disengage the drive system allowing it to rotate (e.g., allowing the output shaft 16 to rotate freely). The sealed actuator with internal clutching assembly 10 is in a waterproof housing and can rotate in both directions for as many revolutions as needed. The clutch is fully self contained in the housing. The actuator has an output passthrough drive structure, e.g., output shaft 16 arrangement, allowing it to drive a shaft or part from either side or both sides. The actuator can be mounted to a fixed part with the only external moving part is the drive. The clutch system 12 of the sealed actuator with internal clutching assembly 10 also does not change shape or height when it clutches, which is yet another significant advantage.

The sealed actuator with internal clutching assembly 10 of the present invention can be, by way of non-limiting example, used with various applications including, but not limited to, vehicle rear spoilers, air diffusers that move, active grill shutter systems, and underbody environments with moving components. For example, the sealed actuator with internal clutching assembly 10 can be used in applications with a rear spoiler such that under regular aerodynamics the rear spoiler stays in position, but under a predetermined load such as contact from pushing on the spoiler, the rear spoiler will be moved out of the way without damage, e.g., to the actuator.

Figure 5:
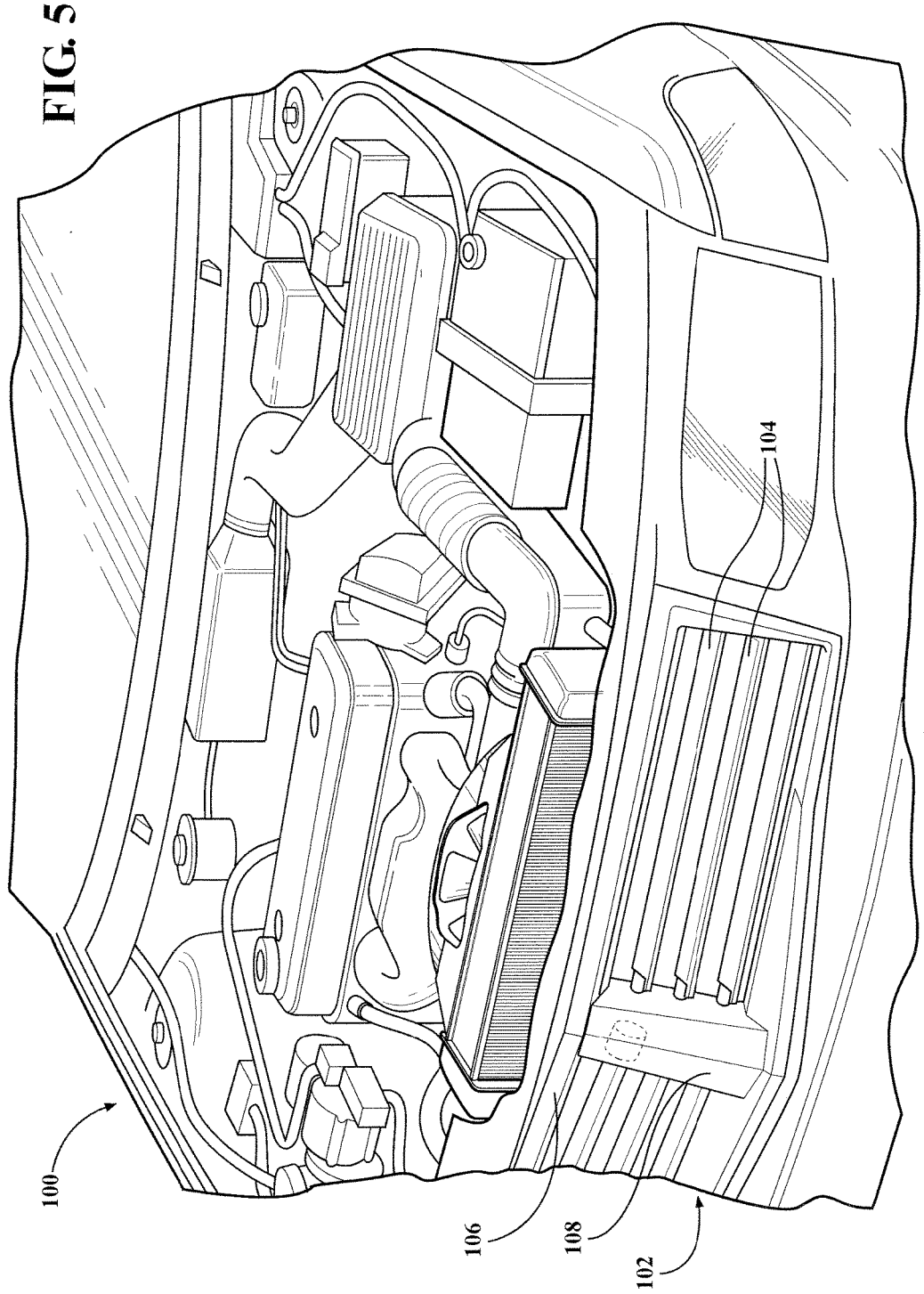
FIG. 5 is a partially broken away perspective view of a vehicle engine compartment having an active grille attached, as an example of an environment of use of an actuator with internal clutching assembly, in accordance with the present invention.

Referring now to FIG. 5, there is illustrated an example of application with an active grill-type system. FIG. 5 is a partially broken away perspective view of a vehicle engine compartment 100 is shown with an active grille 102 connected. The active grille 102 has two or more vanes 104 that are moveable between an open position and a closed position in order to regulate airflow to the vehicle engine compartment 100. The two or more vanes 104 as shown in FIG. 5 include a total of six vanes as part of the active grille 102. However, any number of vanes can be implemented including a single vane depending on the needs of a particular application. The active grille 102 has a frame 106 and center bar 108 that serve to both define a passage for airflow and provide a mountable surface to which the two or more vanes 104 can rotate between the closed position and open position. An electrically driven actuator is connectable to the active grille 102 and configured to provide power that drives the vanes 104 between the open position and closed position.

Figure 6:
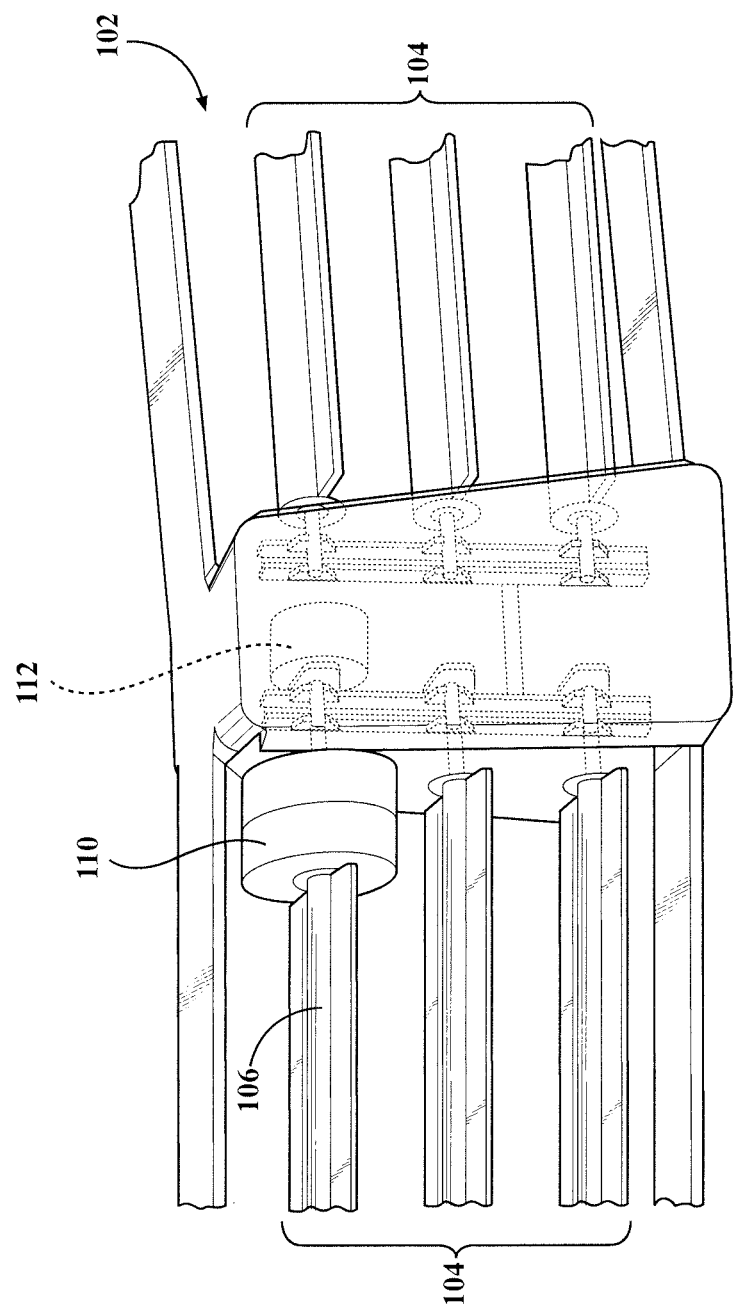
FIG. 6 is a partially broken away sectional plan view of an active grille system, as an example of an application of use with the actuator with internal clutching assembly, in accordance with the present invention.

FIG. 6 shows a partially broken away exploded perspective view of the active grille 102 of FIG. 5. The two or more vanes 104 have at least one driven vane 106 that is connected to an actuator 112 (e.g., sealed actuator with internal clutching assembly shown in FIGS. 1-4). During normal operation of the active grille 102, the actuator 112 provides power to drive and move the at least one driven vane 106 between the closed position and open position. Optionally, also connected to the at least one driven vane 106 is a fail safe module 110 that is connected between the at least one driven vane 106 and the actuator 112. The fail safe module 110 functions to disconnect the at least one driven vane 106 and all of the other two or more vanes 104 from the actuator 112 in the event of power failure or other disruption of the actuator 112 in order to move the two or more vanes 104. It is desirable that the two or more vanes 104 are not in the closed position so that airflow through the active grille 102 to the vehicle engine compartment 100 will not be disrupted. When it is not desired to have airflow disrupted to the vehicle engine compartment 100, such as when the engine is already at optimal heating conditions, preventing airflow to the vehicle engine compartment 100 can result in engine overheating.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A sealed actuator with internal clutching for attachment to a vehicle component, comprising:
    an output shaft with an output gear and an output detent ring that are free to rotate about the output shaft;
    a moving detent ring slidably mounted on said output shaft and selectively radially locked to the output shaft for rotation with the output shaft;
    first intermeshing ramped teeth on the output detent ring in selective meshed engagement with second intermeshing ramped teeth on the moving detent ring;
    a wave spring mounted on said output shaft providing a biasing force against said moving detent ring thereby selectively holding the second intermeshing ramped teeth of the moving detent ring against the first intermeshing ramped teeth of the output detent ring, wherein upon receiving a predetermined level of high load sufficient to overcome the biasing force of the wave spring, the first intermeshing ramped teeth and the second intermeshing ramped teeth will create an axile force that overcomes the biasing force of the wave spring, that allows the moving detent ring to disengage from the output shaft and allows the output shaft to rotate freely;
    a housing portion that is fixed and sealed within which said output shaft is mounted;
    a main gear having selective torsional force transferring gear contact with said output gear;
    a motor having a worm gear providing selective torsional force transferring gear contact with said main gear wherein said worm gear is rotatable to transmit torque from said motor through said main gear and said output gear to the outside of said housing portion via the output shaft.

2. The sealed actuator with internal clutching of claim 1, wherein said output detent ring is mounted to selectively rotate on said output shaft.

3. The sealed actuator with internal clutching of claim 1, wherein said moving detent ring is mounted to selectively move axially on said output shaft.

4. The sealed actuator with internal clutching of claim 1, wherein said moving detent ring is locked radially with respect to said output shaft.

5. The sealed actuator with internal clutching of claim 1, wherein said output shaft further comprises interlocking splines and said moving detent ring further comprises outer interlocking splines, wherein said moving detent ring is locked radially on said output shaft by said outer interlocking splines and respective interlocking splines.

6. The sealed actuator with internal clutching of claim 1, wherein said actuator does not change height when it clutches.

7. The sealed actuator with internal clutching of claim 1, wherein said actuator does not change shape or height when it clutches.

8. The sealed actuator with internal clutching of claim 1, wherein said output gear has circumferential segments in mesh with recesses in said output detent ring.

9. The sealed actuator with internal clutching of claim 1, further comprising a first locking ring and a second locking ring located toward respective ends of said output shaft to hold together said output shaft, output gear, output detent ring, moving detent ring, and wave spring on said output shaft.

10. The sealed actuator with internal clutching of claim 1, wherein said motor further comprises a printed circuit board (PCB), said PCB correlating with vehicle communication networks and/or at least one sensor for commanding energizing of said motor based upon predetermined conditions.

11. The sealed actuator with internal clutching of claim 1, wherein said housing portion has a first half and a second half that are joined and held together by fasteners to form a waterproof housing.

12. The sealed actuator with internal clutching of claim 11, further comprising a first seal and a second seal that are rings mounted toward the ends of said output shaft to form a weather tight seal between said output shaft and a respective opening in said first half and second half.

13. The sealed actuator with internal clutching of claim 12, wherein said motor and electronics and connector contacts of said motor are located within a cavity formed by a first motor cavity located in said second half and a second motor cavity in said second half, and said main gear is located within a cavity formed by a main gear cavity located in said first half and a second main gear cavity in said second half.

14. The sealed actuator with internal clutching of claim 13, wherein said moving detent ring, wave spring, output detent ring, output gear, output shaft, and a first and second retaining ring are located in a first clutch assembly cavity and second clutch assembly cavity in said first and second half, respectively.

15. The sealed actuator with internal clutching of claim 1, wherein said output shaft is rotatable in both directions.

16. The sealed actuator with internal clutching of claim 1, wherein said sealed actuator with internal clutching provides an output pass through drive arrangement allowing said sealed actuator with internal clutching to drive a shaft or an external moving part from either end or both ends.

17. The sealed actuator with internal clutching of claim 1, wherein said sealed actuator with internal clutching is used for driving an active grill system.

18. A sealed actuator with internal clutching for attachment to a vehicle component, comprising:
- an output shaft with a lower portion having a plurality of interlocking splines;
- an output detent ring rotatably mounted on a portion of said output shaft having no interlocking splines;
- an output gear rotatably mounted on said portion of said output shaft having no interlocking splines, where said output gear is in mesh with said output detent ring, wherein the output detent ring and the output gear are free to rotate about the output shaft;
- a moving detent ring slidably mounted on said lower portion of said output shaft, where said moving detent ring is intermeshable with said output detent ring and the moving detent ring is selectively radially locked to the output shaft for rotation with the output shaft;
- first intermeshing ramped teeth on the output detent ring in selective meshed engagement with second intermeshing ramped teeth on the moving detent ring;
- a wave spring mounted on said output shaft providing a biasing force against said moving detent ring thereby selectively holding the second intermeshing ramped teeth of the moving detent ring against the first intermeshing ramped teeth of the output detent ring, wherein upon receiving a predetermined level of high load sufficient to overcome the biasing force of the wave spring, the first intermeshing ramped teeth and the second intermeshing ramped teeth will create an axile force that overcomes the biasing force of the wave spring, that allows the moving detent ring to disengage from the output shaft and allows the output shaft to rotate freely preventing damage to the sealed actuator with internal clutching;
- a housing portion that is fixed and sealed within which said output shaft is mounted;
- a main gear having selective torsional force transferring gear contact with said output gear;
- a motor having a worm gear providing selective torsional force transferring gear contact with said main gear wherein, said worm gear is rotatable to transmit torque from said motor through said main gear and said output gear to the outside of said housing portion via the output shaft.

19. The sealed actuator with internal clutching of claim 18, wherein said output detent ring is mounted to selectively rotate on said output shaft.

20. The sealed actuator with internal clutching of claim 18, wherein said moving detent ring further comprises outer interlocking splines, wherein said moving detent ring is locked radially on said output shaft by said outer interlocking splines and respective interlocking splines.

21. The sealed actuator with internal clutching of claim 18, wherein said motor further comprises a printed circuit board (PCB), said PCB correlating with vehicle communication networks and/or at least one sensor for commanding energizing of said motor based upon predetermined conditions.

22. The sealed actuator with internal clutching of claim 18, further comprising a first seal and a second seal that are rings mounted toward the ends of said output shaft to form a weather tight seal between said output shaft and a respective opening in a first half and second half of said housing portion, said first seal and a second seal when joined together forming a waterproof housing.

23. A sealed actuator with internal clutching for attachment to a vehicle component, comprising:
- an output shaft with a lower portion having a plurality of interlocking splines;
- an output detent ring rotatably mounted on a portion of said output shaft having no interlocking splines such that said output detent ring is free to rotate on said output shaft;
- an output gear rotatably mounted on said portion of said output shaft having no interlocking splines, where said output gear is in mesh with said output detent ring, wherein the output detent ring and the output gear are free to rotate about the output shaft;
- a moving detent ring slidably mounted on said lower portion of said output shaft, where the moving detent ring is selectively radially locked to the output shaft for rotation with the output shaft;
- first intermeshing ramped teeth on the output detent ring in selective meshed engagement with second intermeshing ramped teeth on the moving detent ring;
- outer interlocking splines formed on said moving detent ring interlockable with said interlocking splines formed on said output shaft to selectively prevent radial movement of said moving detent ring;
- a wave spring mounted on said output shaft providing a biasing force against said moving detent ring thereby selectively holding the second intermeshing ramped teeth of the moving detent ring against the first intermeshing ramped teeth of the output detent ring, wherein upon receiving a predetermined level of high load sufficient to overcome the biasing force of the wave spring, the first intermeshing ramped teeth and the second intermeshing ramped teeth will create an axile force that overcomes the biasing force of the wave spring, that allows the moving detent ring to disengage from the output shaft and allows the output shaft to rotate freely preventing damage to the sealed actuator with internal clutching;
- a housing portion forming a weather tight seal;
- a main gear having selective torsional force transferring gear contact with said output gear;
- a motor having a worm gear providing selective torsional force transferring gear contact with said main gear wherein said worm gear is rotatable to transmit torque from said motor through said main gear and said output gear to the outside of said housing portion via the output shaft.

* * * * *